US007814519B2

(12) United States Patent
Rao et al.

(10) Patent No.: US 7,814,519 B2
(45) Date of Patent: Oct. 12, 2010

(54) PROVIDING AND RECEIVING ON-DEMAND ASSETS USING A POOL OF ASSETS CONTAINING UNAVAILABLE ASSETS

(75) Inventors: Yogananda Rao, Sunnyvale, CA (US); Suresh P. Babu, Cupertino, CA (US)

(73) Assignee: Microsoft Corporation, Redmond, WA (US)

( * ) Notice: Subject to any disclaimer, the term of this patent is extended or adjusted under 35 U.S.C. 154(b) by 1254 days.

(21) Appl. No.: 10/407,118

(22) Filed: Apr. 4, 2003

(65) Prior Publication Data

US 2004/0210936 A1 Oct. 21, 2004

(51) Int. Cl.
*H04N 7/173* (2006.01)
(52) U.S. Cl. .............................. 725/86; 725/87; 725/91; 725/101; 725/119
(58) Field of Classification Search ................. 725/101, 725/91, 119, 86
See application file for complete search history.

(56) References Cited

U.S. PATENT DOCUMENTS

| 5,631,694 | A | 5/1997 | Aggarwal et al. | |
|---|---|---|---|---|
| 6,418,557 | B1 * | 7/2002 | Otani | 725/96 |
| 6,438,596 | B1 | 8/2002 | Ueno et al. | |
| 6,782,550 | B1 * | 8/2004 | Cao | 725/39 |
| 7,010,801 | B1 * | 3/2006 | Jerding et al. | 725/95 |
| 7,024,681 | B1 * | 4/2006 | Fransman et al. | 725/115 |
| 7,159,235 | B2 * | 1/2007 | Son et al. | 725/91 |
| 2002/0016969 | A1 * | 2/2002 | Kimble | 725/87 |
| 2003/0005452 | A1 * | 1/2003 | Rodriguez | 725/86 |
| 2003/0051251 | A1 * | 3/2003 | Sugimoto et al. | 725/95 |
| 2003/0149975 | A1 * | 8/2003 | Eldering et al. | 725/34 |
| 2004/0088412 | A1 * | 5/2004 | John et al. | 709/226 |

(Continued)

FOREIGN PATENT DOCUMENTS

JP  2002041994 A  2/2002

(Continued)

OTHER PUBLICATIONS

Aggarwal et al., "Adaptive Video on Demand," Proceedings of the Thirteenth Annual ACM Symposium on Principles of Distributed Computing, Los Angeles, California, ACM Press, 1994, p. 402.

(Continued)

*Primary Examiner*—Joseph P Hirl
*Assistant Examiner*—Jivka Rabovianski
(74) *Attorney, Agent, or Firm*—Lee & Hayes, PLLC

(57) ABSTRACT

A method for providing assets includes providing information to a user regarding at least one asset from a pool of assets, where the pool of assets includes a subset of available assets and a subset of unavailable assets, and then receiving a user's request for an asset from the pool of assets to define a requested asset. The method further includes determining whether the requested asset is: (a) within the subset of available assets; or (b) within the subset of unavailable assets. The method further includes, when the requested asset is within the subset of available assets, immediately providing the requested asset to the user. Further, the method includes, when the requested asset is within the subset of unavailable assets, offering to provide the requested asset to the user when a number of requests for the requested asset exceeds a threshold.

19 Claims, 5 Drawing Sheets

U.S. PATENT DOCUMENTS

2004/0221308 A1* 11/2004 Cuttner et al. ............... 725/46
2004/0268407 A1* 12/2004 Sparrell et al. .............. 725/116
2005/0278741 A1* 12/2005 Robarts et al. ............... 725/46
2006/0271973 A1* 11/2006 Jerding et al. ................ 725/86
2007/0094690 A1* 4/2007 Rodriguez et al. ........... 725/58

FOREIGN PATENT DOCUMENTS

JP        2002123447 A    4/2002

OTHER PUBLICATIONS

Chervenak et al., "Choosing the Best Storage System for Video Service," Proceedings of the Third ACM International Conference on Multimedia, San Francisco, California, ACM Press, 1995, pp. 109-119.

Griwodz et al., "Long-Term Movie Popularity Models in Video-On-Demand Systems: or the Life of an On-Demand Movie," Proceedings of the Fifth ACM International Conference on Multimedia, Seattle, Washington, ACM Press, 1997, pp. 349-357.

Choi et al., "A Prefetching Scheme Based on the Analysis of User Access Patterns in News-On-Demand System," Proceedigns of the Seventh ACM International Conference on Multimedia (Part 1), Orlando, Florida, ACM Press, 1999, pp. 145-148.

Chan, "Distributed Servers Architecture for Networked Video Services," IEEE/ACM Transactions on Networking (TON), vol. 9, Issue 2, Apr. 2001, pp. 125-136.

* cited by examiner

PROVIDING AND RECEIVING ON-DEMAND ASSETS USING A POOL OF ASSETS CONTAINING UNAVAILABLE ASSETS

TECHNICAL FIELD

This invention relates to providing assets to users, and to receiving such assets. In a more particular implementation, this invention relates to providing on-demand video assets, and to receiving such on-demand video assets.

BACKGROUND

Current video on-demand (VOD) systems typically provide a fixed collection of video assets for consumption by users. A head-end system stores these assets in one or more data storage devices, and provides a user with a list of available video assets. The user can browse through the list of available assets using various search strategies, such as by entering a keyword associated with a desired video asset. The user can purchase any video asset that matches the user's interests. The head-end system responds by delivering the purchased video asset to the user.

The data storage devices provided by the head-end system commonly store a relatively limited collection of available video assets, and therefore provide the user with a corresponding limited list of available video assets to select from. As a result, a user may scan the list of video assets to find that a desired title is not contained in the list. The system provides no provision for ordering an asset that is not provided on the list of available assets. If the user's purchase attempts are repeatedly thwarted in this manner, the user may become dissatisfied with the VOD system, and may potentially stop using the VOD system. The user's dissatisfaction also negatively impacts the commercial entity that provides the video assets, as the entity loses a sale each time a willing purchaser cannot find a desired video asset.

Accordingly, there is an exemplary need in the art for a more efficient and potentially more lucrative way of providing on-demand assets to users, such as on-demand video assets.

SUMMARY

In one exemplary implementation, a method is described for providing assets. The method includes providing information to a user regarding at least one asset from a pool of assets, where the pool of assets includes a subset of available assets and a subset of unavailable assets, and then receiving a user's request for an asset from the pool of assets to define a requested asset. The method further includes determining whether the requested asset is: (a) within the subset of available assets; or (b) within the subset of unavailable assets. The method further includes, when the requested asset is within the subset of available assets, immediately providing the requested asset to the user. Further, the method includes, when the requested asset is within the subset of unavailable assets, offering to provide the requested asset to the user when a number of requests for the requested asset exceeds a threshold.

In another exemplary implementation, a method for providing on-demand assets includes determining whether a requested asset is: case (a): available without substantial delay; case (b): available after a delay; or case (c): unavailable. In the event of case (a), the method entails providing the requested asset to the user. In the event of case (b), the method entails querying the user to determine whether the user wishes to receive the requested asset after a delay. In the event of case (c), the method entails logging the user's request for the requested asset.

In one exemplary implementation, the above-described methods provide the user with a relatively large pool of assets to choose from, and provide a strategy for making a subset of frequently-requested assets available to the user. These methods therefore increase the chances that the user will find and purchase an asset that meets the user's interest. As a consequence, these methods also potentially increase the profitability of an asset delivery service, that is, by reducing the number of user requests that are not satisfied by the service.

Related apparatus and system implementations are also described.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The ensuing disclosure describes a video on demand (VOD) technique for providing on-demand video assets (such as movies) to a user for viewing on the user's television set (or other viewing apparatus). However, the features described herein also apply to the delivery of other assets to users, such as audio assets (such as music), application assets (such as games), image assets (such as .JPEG or .GIF images), and other assets. In one application, a user must pay a fee to receive a video asset. In another application, the video assets are provided free of charge.

A. EXEMPLARY IMPLEMENTATION OF VOD DELIVERY SYSTEM

The VOD technique described herein can be implemented using many different kinds of system infrastructures. For instance, the VOD technique can be implemented in the context of a relatively conventional arrangement in which a head-end site disseminates programs and/or related program data to users using conventional broadcasting strategies (such as satellite transmission, cable transfer, etc). Alternatively, the VOD technique can be implemented in the context of an arrangement in which a head-end site disseminates programs and/or related program data to users using a digital network, such as an Internet Protocol (IP) network. Alternatively, the VOD technique can be implemented in the context of an arrangement where a local storage mechanism provides programs and/or related program data to users (e.g., where the local storage mechanism can be under the control of the user, and located at the user's premises). Still other strategies can be used, including various kinds of hybrid arrangements that combine features of different kinds of strategies. For example, in one exemplary implementation, a user can receive program listing data, e.g., Electronic Program Guide (EPG) data, from an IP network source, yet receive the actual programs from conventional satellite or cable transmission paths.

Figure 1:
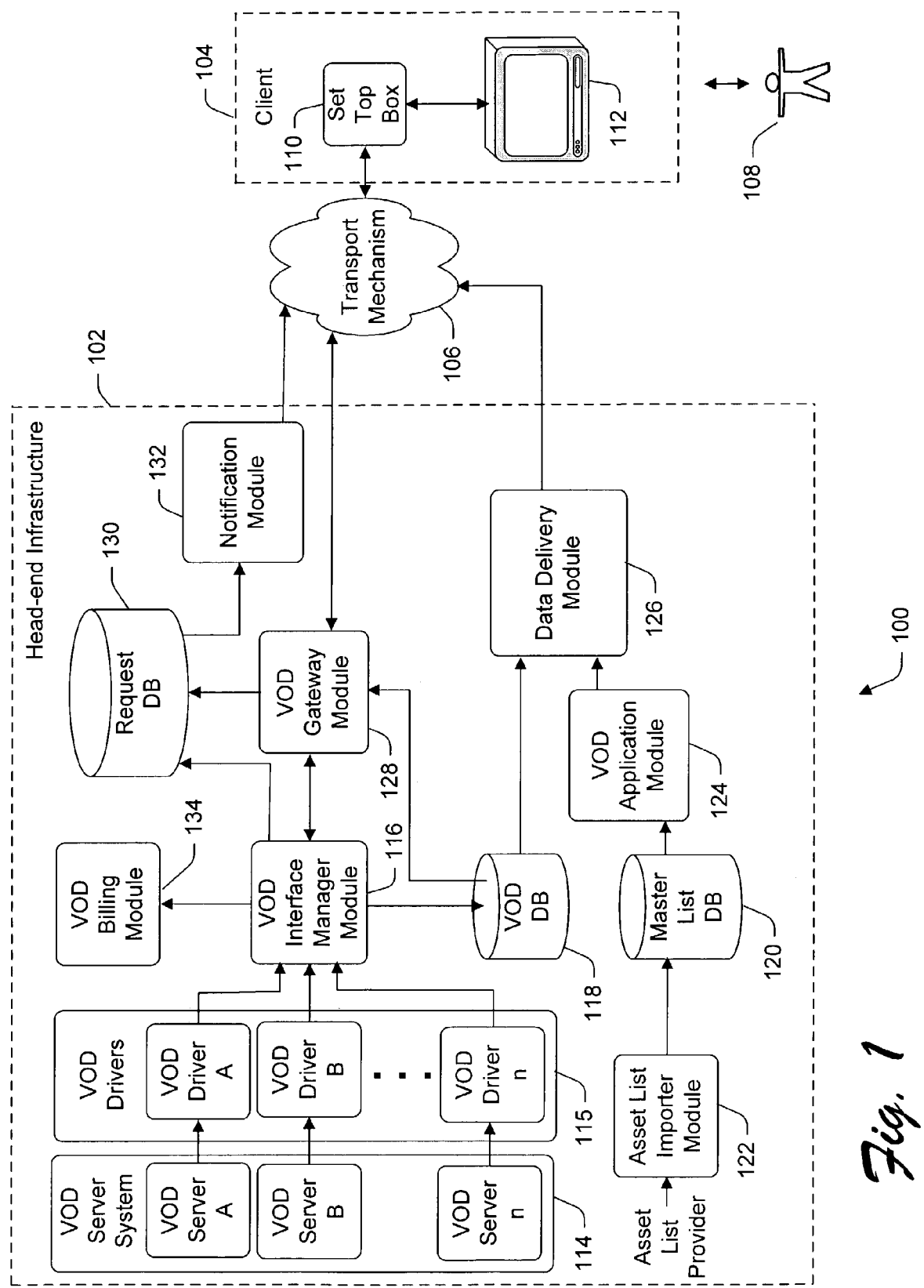
FIG. 1 shows an exemplary system for implementing a video one-demand (VOD) delivery technique described herein.

FIG. 1 shows one exemplary and non-limiting system 100 for implementing the VOD technique described herein. By way of overview, the system 100 include head-end infrastructure 102 located at a head-end site (or multiple distributed head-end sites). The head-end infrastructure 102 is coupled to one or more clients, including an exemplary client 104, via transport mechanism 106. The transport mechanism 106 can constitute a conventional cable communication infrastructure that provides two-way communication between the head-end infrastructure 102 and the client 104, a satellite communication infrastructure, a digital network communication infrastructure (such as the Internet, etc.), or some combination of these infrastructures. A user 108 interacts with the video assets provided by the head-end infrastructure 102 via the client 104, e.g., by browsing through lists of video assets, selecting a video asset, purchasing a video asset, and then receiving (e.g., viewing) a video asset.

The client 104 can include a set-top box 110 coupled to a viewing apparatus 112, such as a television set. In one application, the set-top 110 can constitute a separate module that is communicatively coupled to the viewing apparatus 112. In another implementation, the functionality provided by the set-top box 110 can be incorporated into the console of the viewing apparatus 112. In any case, although not specifically illustrated, the set-top box 110 can include conventional computing hardware, including one or more communication interfaces, one or more processors, memory (e.g., RAM, ROM, disc storage, etc.), buses, etc. The memory can store various application programs used to provide services to the user 108. In one implementation, the set-top box 110 is configured as a "thin" client, meaning that the bulk of the processing tasks involved in providing the VOD service are allocated to the head-end infrastructure 102. In another implementation, a subset of tasks involved in providing the VOD service can be implemented locally in the set-top box 110. In either case, program code stored in the set-top box 110 can be retrieved from permanent memory (e.g., ROM, Flash, etc.) provided by the set-top box 110, retrieved from removable storage media provided by the set-top box 110, downloaded from the head-end infrastructure 102, and/or retrieved from some other program source.

The head-end infrastructure 102 includes a collection of modules for performing its ascribed tasks. Each module can be implemented as a separate data processing unit including conventional computer hardware (such as one or more processors, memory, communication interfaces, bus logic, etc.). Alternatively, a collection of modules can be implemented as respective program modules in a single data processing unit. The modules can be coupled together using point-to-point communication links (e.g., hardwired and/or wireless links), or using a digital network.

To begin with, the head-end infrastructure 102 includes a VOD server system 114. The VOD server system 114 includes one or more VOD servers. That is, in the exemplary case of FIG. 1, the VOD server system 114 includes VOD server A, VOD server B, and VOD server n. Additional (or fewer) video servers can also be provided. Although not shown, each of the video servers can include a database associated therewith for storing a collection of video assets (i.e., movies, games, etc.). In one implementation, different commercial vendors maintain the different video servers. Accordingly, the VOD server system 114 can include a collection of video servers that use different respective protocols for storing and accessing video assets. Exemplary technologies that can be used to implement the VOD server system 114 include video server technology provided by SeaChange International of Maynard, Mass., video server technology provided Concurrent Computer Corporation of Atlanta, Ga., etc.

The head-end infrastructure 102 also includes a collection of VOD drivers 115, including exemplary VOD driver A for interacting with VOD server A, VOD driver B for interacting with VOD server B, and VOD driver n for interacting with VOD server n. The drivers are configured to interface with their respective servers using the protocols employed by their respective servers.

A VOD interface manager module 116 interacts with the VOD server system 114. More specifically, one function that the VOD interface manager module 116 performs is to determine a list of video assets that are available at a given time from different VOD servers in the VOD server system 114. It can perform this task by periodically polling the VOD server system 114 to determine what video assets it contains. Alternatively, the VOD server system 114 can notify the VOD interface manager module 116 when it has loaded a new video asset, removed a video asset, etc. Another function that the VOD interface manager module 116 performs is to coordinate the retrieval and playback of a video asset from the VOD server system 114 when the user has purchased the video asset. In one implementation, each video asset includes an ID which identifies the VOD server from which it can be obtained. Thus, the VOD interface manager module 116 can retrieve a video asset by determining the ID associated with the asset, and then contacting the VOD server associated with the ID.

A VOD database 118 includes one or more storage devices for storing a list of video assets that are provided by the different VOD servers in the VOD server system 114. In one implementation, the VOD database 118 can store descriptive information regarding the available video assets, including title, actor information, rating information, price information, etc. Such information is referred to as electronic program guide (EPG) data. In another implementation, the VOD database 118 can also receive and store the video assets themselves (or some subset thereof), thus eliminating the need for the VOD interface manager module 116 to interact with the VOD server system 114 to retrieve such video assets.

The head-end site infrastructure 102 also includes a master listing database 120 that includes one or more storage devices for storing a master list of video assets. The master list of video assets is commonly much more inclusive than the list of video assets provided in the VOD database 118. In one case, for instance, the master list of video assets stored in the master listing database 120 can include virtually every movie ever produced for commercial distribution in the entire history of motion picture production. Accordingly, in this case, the video assets listed in the VOD database 118 will include only a small fraction of the video assets listed in the master listing database 120. Of course, less inclusive master lists can also be used.

An asset list importer module 122 supplies asset information to the master listing database 120. It can perform this task by obtaining the asset information from one or more third party providers of such information. For instance, the asset list importer module 122 can obtain the asset information by interacting with a service which provides such information via the Internet. The third party provider can provide the asset information free of charge, or may charge a fee for such information. The asset list importer module 122 can cull such asset information at scheduled times. Alternatively, the third party provider can independently download asset information to the asset list importer module 122 on a periodic basis, or whenever there is a change in the asset information.

The head-end infrastructure 102 can use additional techniques for inputting asset information into the master listing database 120. In one implementation, the commercial entity that operates the head-end infrastructure 102 can directly input asset information into the master listing database 120 using a data entry mechanism (not shown) (such as a computer workstation coupled to the master listing database 120). In another implementation, the VOD interface manager module 116 can supply asset information directly to the master listing database 120. For instance, whenever a new asset is provided by the VOD server system 114, the VOD interface manager module 116 can be configured to forward asset information regarding this new asset to the master listing database 120. In one strategy, the master listing database 120 can be configured to retain asset information that is collected through the above-described procedure even though the assets themselves may have been subsequently removed from the VOD server system 114. Accordingly, through this procedure, the asset information stored in the master listing database 120 can be expected to grow over time as the collection of assets stored in the VOD server system 114 varies over time. In other words, in this implementation, the master listing database 120 keeps a permanent log of the assets that have been provided by the VOD server system 114 over a period of time.

A VOD application module 124 and a data delivery module 126 receive asset information from the VOD database 118 and the master listing database 120, and broadcast such asset information to users via the transport mechanism 106. More specifically, the VOD application module 124 provides different interface pages to the client 104 that enables the client 104 to interact with the head-end infrastructure 102. One of these pages may contain a comprehensive list of video assets that is culled from both the video assets listed in the VOD database 118 and the master listing database 120. In other words, the comprehensive list is a union of the video assets culled from the VOD database 118 and the master listing database 120. Another of these pages may provide a listing of only the assets that are currently available (e.g., as reflected by entries in the VOD database 118). In another implementation, the VOD application module 124 can provide an interface that allows a user to search for desired assets by specifying characteristics or attributes of the desired assets (such as titles of the assets, actors and actresses that appear in the assets, and so on). In one case, the VOD application module 124 can provide a comprehensive listing of assets that meet the specified characteristics or attributes, where the comprehensive listing may include both available and unavailable assets. In another case, the VOD application module 124 can provide a listing of only the available assets that meet the specified characteristics or attributes. The data delivery module 126 includes functionality for implementing the actual transfer of data over the transport mechanism 106 to the client 104, such as functionality for performing various data formatting and data transformation operations, etc.

A VOD gateway module 128 receives the user's 108 requests from client 104, and coordinates the supply of video assets to the client 104 in response the user's 108 requests. For instance, as described above, the VOD application module 124, in conjunction with the data delivery module 126, can broadcast a master list of video assets culled from the VOD database 118 and the master listing database 120. In addition, as also described above, the user 108 may make targeted requests for specific information from the VOD database 118 and the master listing database 120. The VOD gateway module 128 coordinates the receipt of such requests, and, in response, coordinates the supply of appropriate asset information to the client 104. Further, the VOD gateway module 128 can coordinate the playback of a video asset, including, if so configured, handling the user's 108 requests for pausing the video asset, fast forwarding the play of the video asset, reversing the play of the video asset, stopping the play of the video asset, etc.

A request database 130 includes one or more storage devices for storing users' requests for video assets. For instance, the head-end infrastructure 102 may not be able to provide every video asset that is requested by the users. The request database 130 can store requests that have not been met by the head-end infrastructure 102. More specifically, the request database 130 can record the identity of the video asset that was requested (e.g., by providing the title of the requested video asset, or other identifying information), as well as the user that requested the video asset.

A notification module 132 sends various notifications to the client 104. For instance, the user 108 may request a video asset which is not immediately available. When (and if) the asset becomes available, the notification module 132 can forward a message to the user 108 informing the user 108 of the availability of the asset. If the set-top box 110 is so configured, the notification module 132 can trigger the activation of a message light (not shown) on the console of the set-top box 110, which alerts the user 108 to the fact that a forwarded message is waiting for the user's review.

Finally, a VOD billing module 134 handles the accounting associated with video asset purchases. In one case, all of the video servers in the video server system 114 are provided and maintained by one commercial entity. In this case, the billing module 134 need not provide specific accounting associated with different video servers. In another case, different commercial providers maintain different respective video servers. In this case, the billing module 134 can include functionality for keeping proper billing records for each video server. In yet another implementation, each video server can maintain its own respective billing module. Still other billing arrangements are possible. For instance, as will be described, the head-end infrastructure 102 includes functionality for offering discounts to users in various circumstances to entice the users to purchases assets. The billing module 134 can include functionality for managing the accounting associated with these discounts. The specific accounting involved in performing this task will vary depending on the contractual arrangements that govern the allocation of costs and financial benefits among the potential plurality of commercial participants associated with the head-end infrastructure 102.

Figure 2:
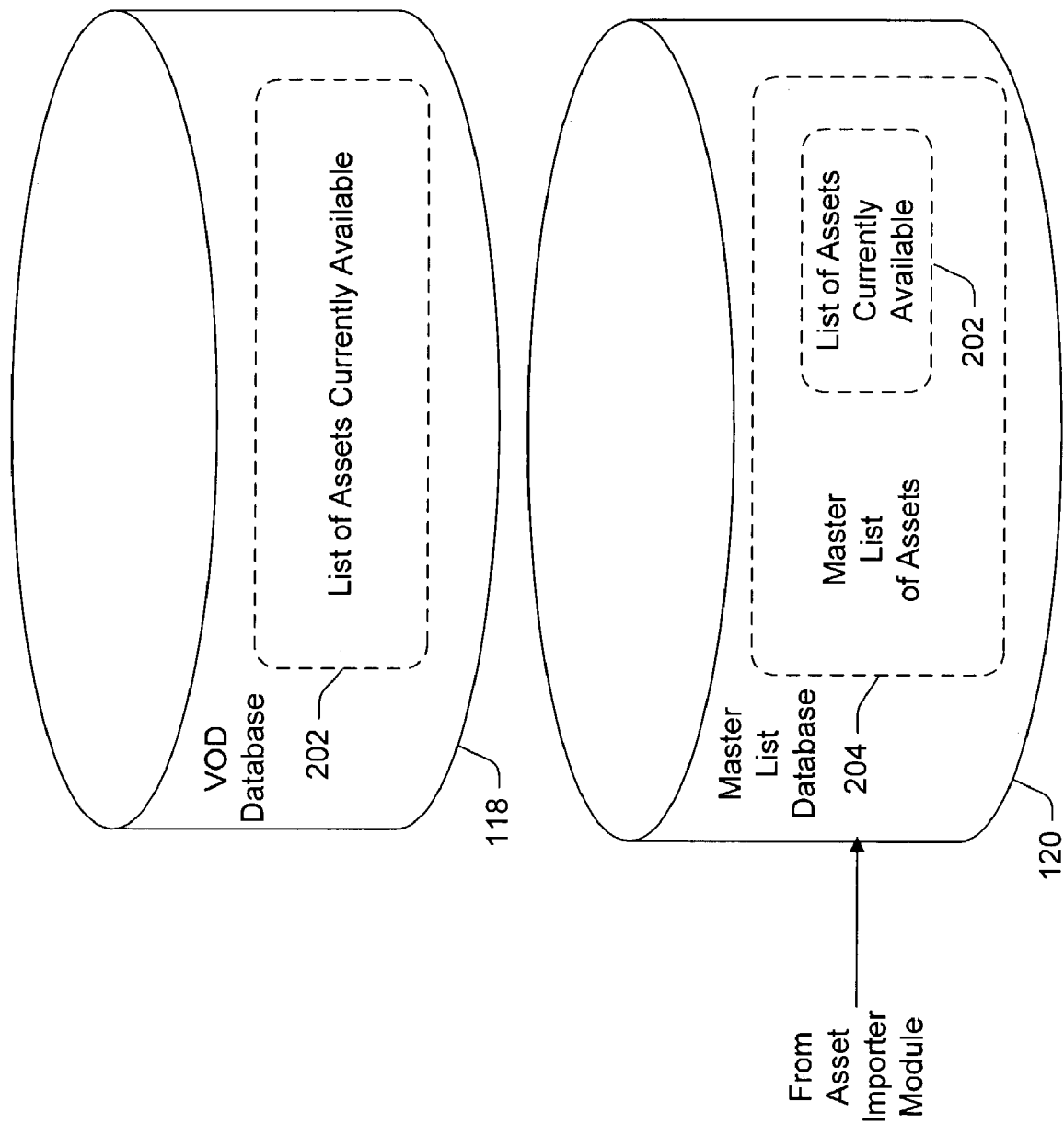
FIG. 2 shows a VOD database and a master listing database used in the system of FIG. 1.

FIG. 2 shows an exemplary relationship between the VOD database 118 and the master listing database 120. The VOD database 118 stores a list 202 of video assets that are currently available on the VOD server system 114. The master listing database 120 typically stores a more comprehensive master list 204 of video assets provided by a third party source. In the case shown in FIG. 2, the list 202 of currently available assets is a subset of the master list 204 of video assets provided in master listing database 120. In other words, in this exemplary case, every asset listed in the VOD database 118 is also present in the more inclusive master listing database 120. This is typically the case, but need not be so. For instance, in another implementation, the VOD database 118 can identify one or more video assets that, for whatever reason, are not included in the master list 204 of video assets.

In one example, the VOD database 118 is implemented as a separate data storage device than the master listing database 120. In another example, the VOD database 118 and the master listing database 120 are implemented in the same storage device, e.g., as different record sections within a single physical storage device.

B. EXEMPLARY METHOD FOR PROVIDING AND RECEIVING VIDEO ASSETS

Figure 3:
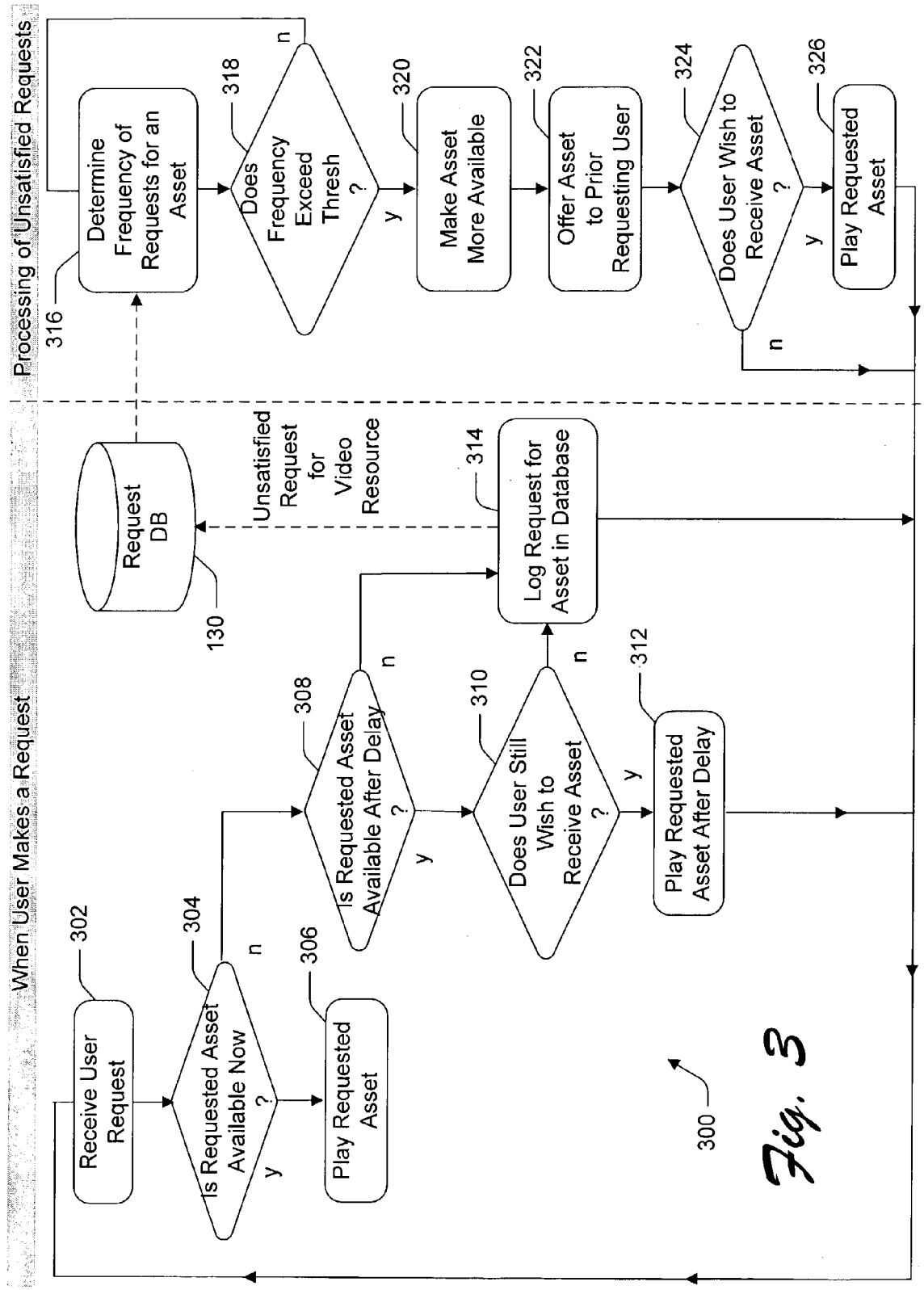
FIG. 3 shows an exemplary flowchart that describes the VOD delivery technique.

FIG. 3 shows an exemplary method 300 for providing video assets using the system 100 shown in FIG. 1. The method includes a first series of steps (grouped on the left side of FIG. 3) that pertain to actions initiated upon a user's request for a video asset. The method includes a second series of steps (grouped on the right side of FIG. 3) that pertain to actions performed by the head-end infrastructure 102 at times not necessarily determined by user's requests. For instance, the actions grouped on the right side of FIG. 3 can be performed by the head-end infrastructure 102 at scheduled "offline" times, such as once a week, once a month, etc.

To begin with, step 302 entails receiving a user's 108 request for a video asset. Such a request may reflect that the user 108 has examined a list of video assets transmitted by the head-end infrastructure 102, and has selected an asset from that list. Alternatively, such a request may reflect that the user 108 has made a targeted inquiry for a specific video asset, received information regarding that video asset, and subsequently selected that video asset for purchase.

In step 304 the head-end infrastructure 102 determines whether the requested video asset is available for immediate consumption by the user 108. As used here, "immediate" generally means that the video asset is available without a significant delay. "Immediate" may correspond to a time lapse that may be experienced as virtually instantaneous, or it may correspond to an appreciable time lapse that lasts several seconds, several minutes, etc. What constitutes "immediate" may often reflect user expectations. If the user 108 is informed that a video asset is available and will be provided "immediately," the user 118 may expect some short delay, but will generally not expect a lengthy delay.

Step 306 entails playing the video asset if it is determined to be immediately available. Playing the video asset can entail streaming the video asset to the user, downloading an entire video asset to a user, unlocking a video asset that is stored locally at the client, or some other playback technique. The fact that a video asset is "immediately available" typically indicates that the asset can be readily obtained from the VOD server system 114, or, in another implementation, from the VOD database 118 itself (that is, providing that the system 100 is configured to store video assets in the VOD database 118).

In step 308, if the head-end infrastructure 102 determines that the requested video asset is not immediately available, the head-end infrastructure 102 determines whether the requested video asset can be supplied after a delay, such as after one or two hours. For instance, the head-end infrastructure 102 may determine that the requested video asset exists in the VOD server system 114, but that it is not currently queued up to immediately be supplied by the VOD server system 114, and therefore can only be supplied after a predetermined delay. In another implementation, the head-end infrastructure 102 may determine that the requested video asset does not exist in the VOD server system 114, but that it can be obtained from another source in a predetermined amount of time. For instance, the commercial entity that provides the head-end infrastructure 102 may have pre-existing contractual arrangements that permit it to receive video assets from one or more partner sources (e.g., available via the Internet, satellite transmission, or some other transmission path or combination of transmission paths) within a predetermined amount of time. For instance, a request for an asset can be transmitted over the Internet (or other digital network) to a partner, and then the asset itself can be delivered by the partner via a satellite or conventional cable transmission path.

If the head-end infrastructure 102 determines that the requested video asset can be made available within a predetermined delay, it transmits a message to the user 108 at the client 104 informing the user 108 of this fact. In step 310, the head-end infrastructure 102 also queries the user 108 to determine whether the user 108 still wants to select the requested video asset for delayed viewing (e.g., in one or two hours). To induce the user 108 to purchase the asset even though there is a delay, the head-end infrastructure 102 can be configured to offer the requested asset at a discount, e.g., at 25% off the list price, 50% off the list price, etc.

If the user 108 accepts the offer, in step 312, the head-end infrastructure 102 plays the requested asset after a delay. If the user 108 does not accept the offer, in step 314, the head-end infrastructure 102 writes an entry in the request database 130 that indicates that the user 108 made a request for a video asset but that the requested video asset was not delivered. In other words, the request database 130 logs the occurrence of an unsatisfied user request.

Returning to decision step 308, there is a possibility that the head-end infrastructure 102 cannot (or will not) furnish the requested video asset at all, even after a delay. For instance, the head-end infrastructure 102 may determine that the requested video asset is not provided by the VOD server system 114, and is further not provided in other server systems that the head-end infrastructure 102 has ready access to. In this case, the head-end infrastructure 102 again records the fact the user has made a request for a specific video asset that the head-end infrastructure 102 was unable to satisfy. Indication of such unsatisfied request is stored (e.g., logged) in the requests database 130, and the user 108 is notified of the unavailability of the requested asset (e.g., by a message sent by the head-end infrastructure 102 to the client 104).

As explained above, the group of steps on the right side of FIG. 3 pertain to the processing of unsatisfied requests stored in the request database 130. In step 316, the head-end infrastructure 102 examines the request database 130 to determine whether there have been a significant number of requests for a specific video asset that were not satisfied by the head-end infrastructure 102. For instance, as reflected in step 318, the head-end infrastructure 102 can determine whether the number of requests for a specific video asset exceed a predetermined threshold, such as 25 requests, in a predetermined configurable reporting period, such as one month. This determination can be automated by the head-end infrastructure 102, that is, by periodically scanning the records in the request database 130, aggregating requests for common video assets, and comparing the aggregated requests to predetermined respective thresholds. Alternatively, step 318 may reflect the exercise of business judgment by a human system operator, who "manually" reviews the requests in the request database 120, and makes a decision as to whether there has been significant recent interest in one or more video assets.

In step 320, if there has been significant interest in an unavailable video asset, the head-end infrastructure 102 can make this video asset available to the clients. It can perform this task by physically transferring and loading the video asset into the VOD server system 114. Alternatively, it can perform this task by making a contractual arrangement with a current provider of the unavailable video asset, the contractual arrangement permitting users of the head-infrastructure 102 to access and video asset, perhaps immediately, or perhaps after a delay.

In step 326, the head-end infrastructure 102 sends a message to all of the users that have previously requested the video asset. This message informs these users that the video asset is now available for viewing. As reflected in step 324, the message may also query the users whether they would like to purchase the asset for immediate consumption (or possibly after a predetermined delay). More specifically, the request database 130 identifies the group of users that had previously made requests for the video asset, thus defining the group of users that will receive the message. In one implementation, the head-end infrastructure 102 sets a cut-off period that truncates membership in the group of users that will receive the message, such as limiting membership in the group to those users that had requested the video asset within the last month, last two months, etc. Again, to promote the sale of the newly available video asset, the head-end system can offer the video asset at a discount (e.g., 25% off list price, 40% off list price, etc.).

In step 326, if the user wishes to purchase the video asset that has been made available, the head-end infrastructure 102 plays the requested video asset. From this juncture on, the status of the video asset is no longer unavailable, but either "immediately available," or "available after a delay." Accordingly, the head-end infrastructure 102 is able to provide the newly available video asset to both those users who had previously requested it, as well as users who may request this asset in the future. However, in one implementation, the head-end infrastructure 102 does not offer the newly available video asset at a discount to subsequent requesters.

The decision logic for executing the steps described above can be distributed over multiple modules shown in FIG. 1, or can implemented in a single module. For instance, in one exemplary implementation, the VOD application module 124 and/or the VOD video gateway module 128 can include logic for determining whether a requested asset is immediately available, available after a delay, or unavailable.

The above-described method can be modified in different ways. For instance, the above-described method was discussed primarily in the context of changing the status of an asset from "unavailable" to "available" based on the number of requests logged for the unavailable asset. However, the same procedure can be used to elevate the status of an asset from "available with delay" to "immediately available." That is, as discussed above, the head-end infrastructure 102 may have offered to provide an asset to the user after a delay, yet the user may have declined such an offer (e.g., see step 310). The request database 130 also logs declined offers. The head-end infrastructure 102 can decide to make an asset having a status of "available with delay" more readily available (e.g., "immediately available") based on the number of declined offers that have been logged for this asset in the request database 130 within a predetermined configurable time period (e.g., within a week, month, year, etc.).

In another modification, the request database 130 can also store requests for assets that are provided after a delay. That is, these entries in the request database 130 reflect instances where users accepted the offer by the head-end infrastructure 102 to provide a delayed asset. If there are a significant number of requests for these delayed assets, then the head-end infrastructure 102 can change the status of these assets from "available with delay" to "immediately available."

In another modification, the head-end infrastructure 102 can also include automated and/or manual decisioning that determines whether available assets are not being frequently selected and purchased by users. This can be performed by recording all of the requests for assets made by users, even those requests that have been immediately satisfied. If there is a specific asset that has a low request rate in a given period of time, then the head-end infrastructure 102 can demote this asset from "immediately available" to "available with delay," or to "unavailable" (or from "available with delay" to "unavailable"). Still additional modifications are both possible and contemplated as being within the scope of the invention.

In another modification, the threshold used to decide whether to make a requested asset more readily available can be set at only one request. That is, if only one user requests an unavailable or delayed asset, then the head-end-infrastructure 102 can make this asset more readily available. More generally, one or more commercial entities that operate the head-end infrastructure 102 can define the threshold (and the associated time period used for aggregating requests) based on various marketing considerations, as well as other considerations.

In still another modification, the information stored in the request database 130 can be used to provide advertisements to users. The advertisements can pertain to any kind of assets (including various kinds of goods and/or services). More specifically, the head-end infrastructure 102 can include a targeting module (not shown). This targeting module can examine the requests stored in the request database 130 and then determine whether to send a user an advertisement based thereon. For instance, the targeting module can send an advertisement to the user for an asset providing that the advertised asset is related to an asset previously requested by the user. Assets are related if they have one or more attributes in common. For instance, two video assets can be considered related if they both feature the same actor. Various other cross-selling strategies can be used in deciding what kinds of advertisements to send to the user. In one application, the targeting module analyzes only unsatisfied requests in determining what advertisements to send to the user. In another application, the targeting module analyzes both satisfied and unsatisfied requests. In still another application, the targeting module can compile a profile regarding the preferences of the user, and then can use this profile in determining what advertisements to send to the user. The targeting module can use a variety of systems in formulating targeted advertisements, including, for instance, rule-based logic, neural network technology, artificial intelligence technology, etc. In another implementation, after examining the request database 130, the targeting module can send the user an actual asset, rather than an advertisement for such an asset.

Figure 4:
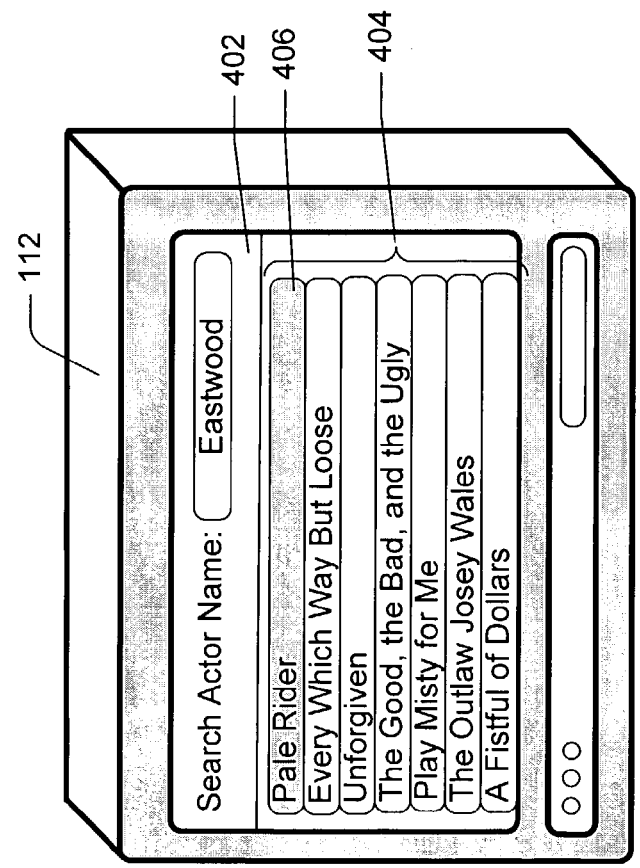
FIG. 4 shows the presentation of a list of assets on a user's viewing apparatus.

FIGS. 4-7 show exemplary interface displays presented on the user's 108 viewing apparatus 112 in the course of using the above-described VOD technique. In FIG. 4, the user 108 has specified via interface field 402 that he or she desires to review movies featuring the actor Clint Eastwood. The head-end infrastructure 102 responds by providing a list of video assets that include Clint Eastwood as an actor in interface field 404. The head-end infrastructure 102 can perform this task by searching actor related-related EGP data maintained by the head-end infrastructure 102. The interface field 404 specifically lists a collection of video asset that is culled from both the VOD database 118 and the master listing database 120. Accordingly, a subset of the video assets listed in the interface field 404 may not be available for viewing by the user. Interface field 406 indicates that the user 108 has selected one of the listed video assets for viewing, namely, the movie "Pale Rider" which features the actor Clint Eastwood.

Although not shown, the head-end infrastructure 102 can provide information that identifies the assets in the displayed list of assets that are available and the assets that are unavailable. The head-end infrastructure 102 can also provide information regarding the assets that are immediately available and the assets that are available after a delay. These different categories of assets can be demarcated by displaying asset information (e.g., movie titles) in different colors, or by providing indicia (e.g., text or other symbols) identifying the different categories, or by using some other demarcation technique. In one exemplary implementation, only assets that are available can be purchased; that is, unavailable assets can only be requested.

Figure 5:
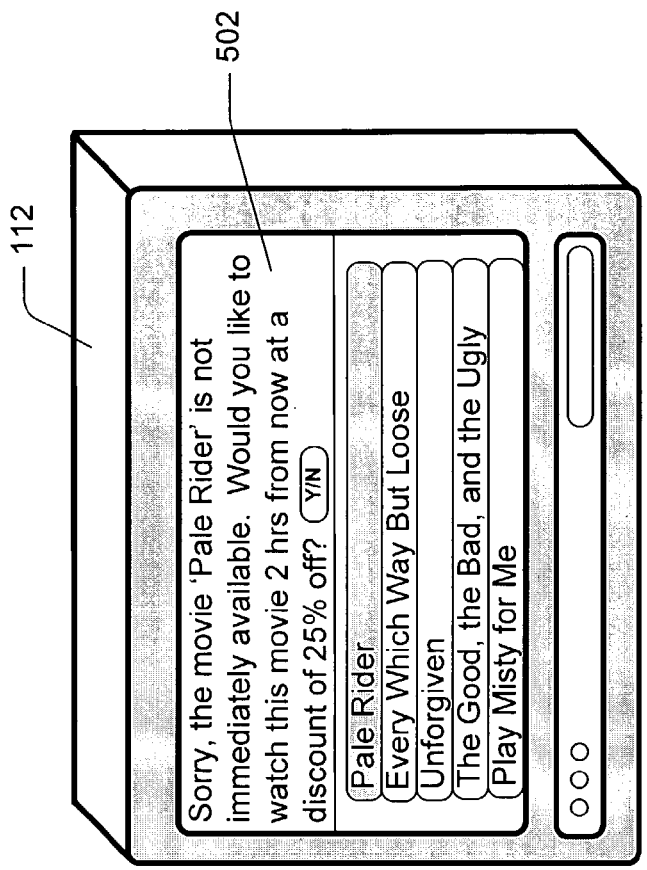
FIG. 5 shows the presentation of a message that informs the user that a requested asset can be provided after a delay.

FIG. 5 pertains to the case where the selected video asset, "Pale Rider," is not available for immediate viewing, but can be provided after a predetermined delay. As indicated in interface field 502, the head-end infrastructure 102 notifies the user of this fact by transmitting a message. The message attempts to induce the user 108 to purchase the video asset, even though it is delayed, by offering the user 108 a discount on the delayed video asset. The head-end infrastructure 102 then receives the user's 108 response to the offer, which, for instance, reflects whether the user 108 has entered a yes or no response as instructed by the interface field 502.

Figure 6:
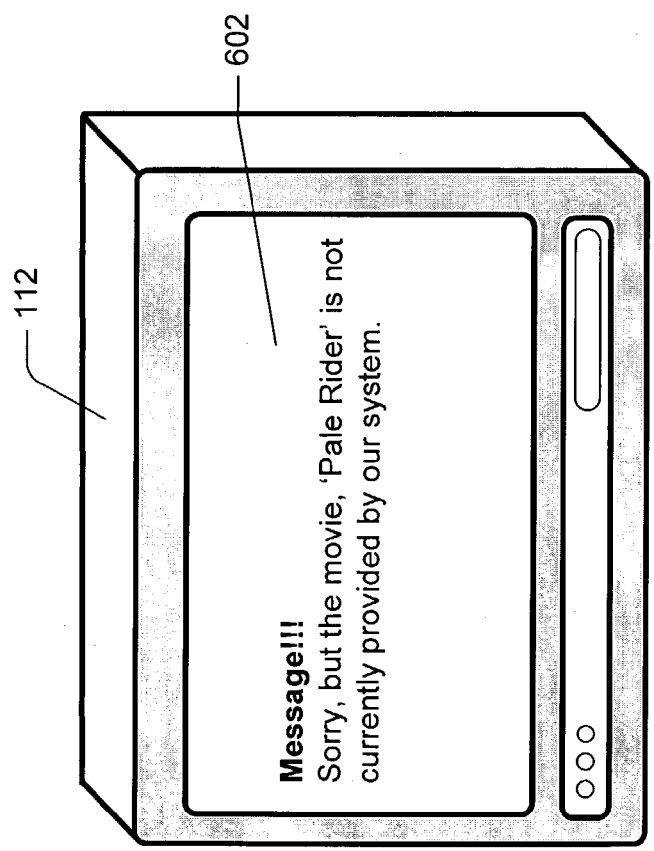
FIG. 6 shows the presentation of a message that informs the user that a requested asset is not available.

FIG. 6 pertains to the case where the requested video asset, "Pale Rider" is simply not available at all. As indicated in field 602, the head-end infrastructure 102 notifies the user 108 of this case by transmitting a message to the client 104. The message simply informs the user 108 that the video asset is not available. In an alternative implementation, the message may alert the user to the fact that the video asset may become available in the future, and that, if this happens, the user 108 will be notified of this occurrence.

Figure 7:
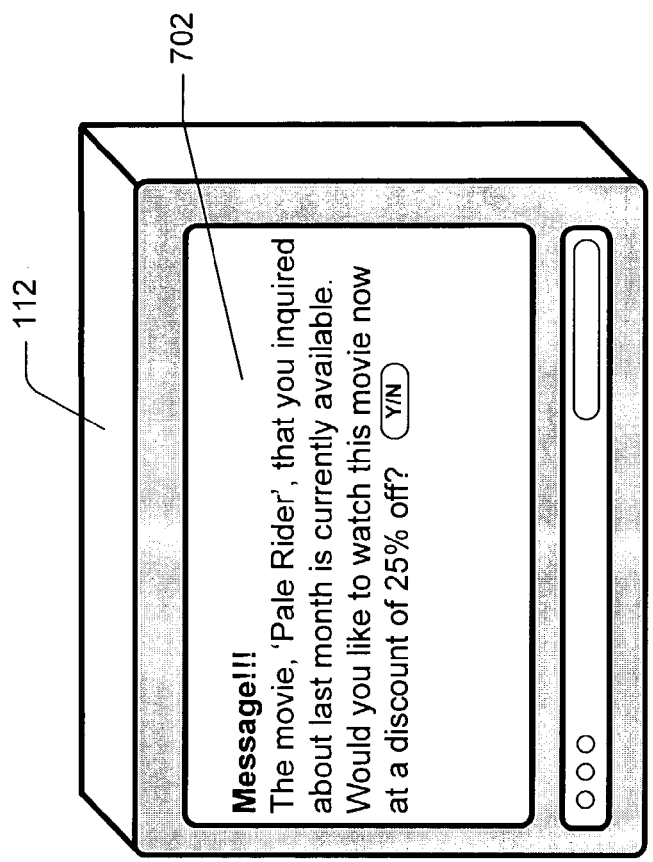
FIG. 7 shows the presentation of a message that informs the user that a previously requested asset is now available for viewing.

FIG. 7 pertains to the case where the requested video asset, "Pale Rider," was once unavailable, but has recently been made available in response to frequent requests for this video asset by multiple users within a predetermined time span (e.g., in a previous month, or in the previous six months, etc.). As indicated in field 702, the head-end infrastructure 102 notifies the user of this event by transmitting a message. The message informs the user that the previously requested video asset is now available, and that it can now be purchased by the user 108 for viewing. Again, the head-end infrastructure 102 can offer the user 108 a discount to induce the user to purchase of the video asset.

The interface presentations shown in FIGS. 4-7 are strictly exemplary. Different presentation content and strategies can be provided to suit different respective application environments.

C. CONCLUSION

A technique was described for providing on-demand video assets based on an expanded list of video assets. The status of an unavailable asset can be promoted to "available" or "available with delay" if a significant number of requests have been made for that asset in a predetermined time span.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for providing assets implemented by an entertainment system head-end, the method comprising:
    providing from the head-end to a particular client device of a plurality of client devices serviced by the head-end, information identifying a plurality of media assets that are currently available on-demand to the particular client device and a plurality of media assets that are not currently available to the particular client device;
    receiving from the particular client device, a user-submitted request for a particular media asset identified in the information to define a requested media asset;
    determining by the head-end whether or not the requested media asset is currently available on-demand to the particular client device;
    in an event that the requested media asset is currently available on-demand to the particular client device, the head-end providing the requested media asset to the particular client device; and
    in an event that the requested media asset is not currently available on-demand to the particular client device:
        the head-end logging, in a request database including other unsatisfied user-submitted requests for the requested media asset received from other ones of the plurality of client devices, an indication of an unsatisfied request for the requested media asset;
        the head-end ascertaining, based on examination of the request database, whether or not a number of unsatisfied requests for the requested media asset exceeds a threshold;
        in an event that the number of unsatisfied requests for the requested media asset does not exceed the threshold, the head-end sending a notification to the particular client device, the notification indicating that the requested media asset is not currently available;
        in an event that the number of unsatisfied requests for the requested media asset exceeds the threshold:
            the head-end obtaining the requested media asset; and
            the head-end sending to the particular client device and the other ones of the plurality of client devices, a notification that the requested media asset is currently available on-demand.

2. A method according to claim 1, wherein individual ones of the plurality of media assets are video assets.

3. A method according to claim 1, wherein the head-end sending to the particular client device and the other ones of the plurality of client devices, a notification that the requested media asset is currently available on-demand includes offering to provide the requested media asset at a discount.

4. A method according to claim 1, wherein in an event that the requested media asset is currently available on-demand to the particular client device, the head-end providing the requested media asset to the particular client device comprising:
    determining whether the particular media asset is available immediately or will be available after a delay;
    in the event that the particular media asset is available immediately, the head-end providing the requested media asset to the particular client device immediately; and
    in the event that the particular media asset will be available after a delay:

the head-end sending a query to the particular client device to determine whether a user wishes to receive the requested media asset after the delay; and upon receiving notification of a user-submitted affirmative response, the head-end providing the requested media asset to the particular client device after the delay.

5. A method according to claim 4, further comprising, upon receiving a notification of a user-submitted negative response, the head-end logging, in the request database, an indication of an unsatisfied request for the requested media asset.

6. A method according to claim 4, wherein the head-end sending a query to the particular client device includes the head-end offering to provide the requested media asset to the particular client device at a discount.

7. A method according to claim 1, further comprising selecting an advertisement based on the user-submitted request, and sending the advertisement to the particular client device.

8. A computer-readable storage medium having computer-executable instructions for performing the method recited in claim 1.

9. A method for providing on-demand assets, the method comprising:

receiving at a head-end infrastructure and from a client device, a user-submitted request from a use for a particular media asset determining by the head-end infrastructure whether the particular media asset is:
  case (a): available immediately to the client device;
  case (b): available to the client device after a delay; or
  case (c): unavailable to the client device;

in the event of case (a), providing the particular media asset to the client device;

in the event of case (b), sending a query to the client device offering to provide the particular media asset after a delay; and in the event of case (c):
  logging the user-submitted request for the particular media asset in a request database comprising other user-submitted requests for media assets that are unavailable to a client device from which a request was received; and
  offering to provide the particular media asset to the client devices from which requests for the particular media asset have been received when a number of logged requests for the particular media asset exceeds a threshold.

10. A computer-readable storage medium having computer-executable instructions for performing the method recited in claim 9.

11. A head-end system for providing assets to a plurality of clients, comprising:

logic configured to provide information to a particular client of the plurality of clients, the information identifying at least one asset that is available on demand to the particular client from the head-end system and at least one asset that is not currently available on-demand to the particular client from the head-end system;

logic configured to receive, from the particular client, a user-submitted request for a particular asset identified in the information to define a requested asset;

logic configured to determine whether the requested asset is an asset that is available on demand to the particular client from the head-end system or whether the requested asset is an asset that is not currently available on-demand to the particular client from the head-end;

wherein the head-end system is configured to, when the requested asset is an asset that is available on-demand to the particular client from the head-end, immediately provide the requested asset to the particular client; and wherein the head-end system is configured to, when the requested asset is an asset that is not currently available on-demand to the particular client from the headend:
  indicate that the request is an unsatisfied request;
  ascertain, based on the unsatisfied request and other unsatisfied requests for the particular asset received from other clients, when a number of unsatisfied requests for the particular asset exceeds a threshold; and
  offer to provide the requested asset to the particular client and one or more of the other clients when the number of unsatisfied requests for the particular asset exceeds the threshold.

12. A system according to claim 11, wherein the assets are video assets.

13. A system according to claim 11, further comprising an asset list importer module configured to provide to the particular client, a catalog listing of assets without regard to whether the assets are available or unavailable on-demand to the particular client.

14. A system according to claim 11, wherein the system is configured to offer the requested asset to the particular client by sending a message that notifies the particular client that the requested asset is now available on-demand.

15. A system according to claim 11, wherein the system is configured to offer the requested asset to the particular client at a discount if the number of unsatisfied requests for the requested asset exceeds the threshold.

16. A system according to claim 11, further comprising:
logic configured to determine whether an asset that is available on-demand to the particular client device from the head-end system is:
  available immediately; or
  available after a delay;
wherein the system is configured to provide the requested asset to the particular client immediately in the event the requested asset is available immediately; and
wherein the system is configured to query the particular client to determine whether a user associated with the particular client wishes to receive the requested asset after a delay, and if a query response is affirmative, to provide the requested asset to the particular client after the delay.

17. A system according to claim 16, wherein the system is configured to log the request for the particular asset in the event that the query response is not affirmative, indicating that a user does not opt to receive the requested asset after the delay.

18. A system according to claim 16, wherein the query provided by the system offers the requested asset to the particular client at a discount.

19. A system according to claim 11, further including logic configured to select an advertisement based on the user-submitted request, and to send the advertisement to the user particular client.

* * * * *